United States Patent [19]

Hehl

[11] Patent Number: 4,680,002
[45] Date of Patent: Jul. 14, 1987

[54] INJECTION MOLDING MACHINE

[76] Inventor: Karl Hehl, Arthur-Hehl-Strasse 32, D-7298 Lossburg 1, Fed. Rep. of Germany

[21] Appl. No.: 852,148

[22] Filed: Apr. 15, 1986

[30] Foreign Application Priority Data

Apr. 15, 1985 [DE] Fed. Rep. of Germany ....... 3513410
Jan. 28, 1986 [DE] Fed. Rep. of Germany ....... 3602439

[51] Int. Cl.$^4$ .............................................. B29C 45/62
[52] U.S. Cl. .................................. 425/186; 425/190; 425/192 R; 425/574
[58] Field of Search ............... 425/182, 190, 550, 574, 425/567, 568, 186, 192 R

[56] References Cited

U.S. PATENT DOCUMENTS

| | | | |
|---|---|---|---|
| 3,068,521 | 12/1962 | Gaspar et al. | 425/568 |
| 3,335,464 | 8/1967 | Schwartz | 425/574 |
| 4,278,354 | 7/1981 | Hehl | 425/558 |
| 4,421,469 | 12/1983 | Egger et al. | 425/186 |

FOREIGN PATENT DOCUMENTS

| | | |
|---|---|---|
| 186024 | 7/1986 | European Pat. Off. |
| 1554768 | 6/1970 | Fed. Rep. of Germany |
| 3229223 | 9/1981 | Fed. Rep. of Germany |

Primary Examiner—Jay H. Woo
Assistant Examiner—Timothy W. Heitbrink
Attorney, Agent, or Firm—Spencer & Frank

[57] ABSTRACT

An injection molding machine includes an injection molding unit, an injection mold assembly, and a first drive for inserting the injection molding unit in and withdrawing it from the injection mold assembly. The injection molding unit includes a plasticizing cylinder, a feed screw accommodated therein, a carrier block form-fittingly receiving the plasticizing cylinder at the rear terminus thereof, a mechanism for axially fixing the position of the plasticizing cylinder in the carrier block, a second drive for imparting injection strokes to the feed screw and a third drive for rotating the feed screw. The plasticizing cylinder has a released position in which it is slightly withdrawn from the injection mold assembly and is separated from the carrier block. A first support situated adjacent the injection mold assembly supporting the plasticizing cylinder at the frontal end thereof and a second support situated at a distance from the first support support the plasticizing cylinder at its rear terminus. The first and second supports support the released plasticizing cylinder such that the latter is upwardly freely removable by a hoist.

19 Claims, 24 Drawing Figures

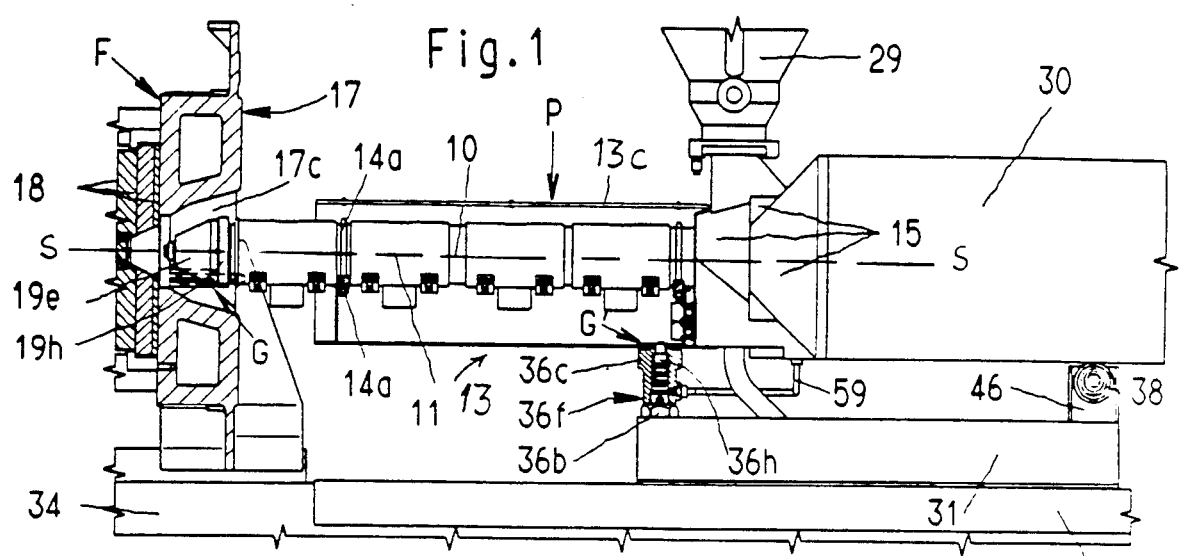
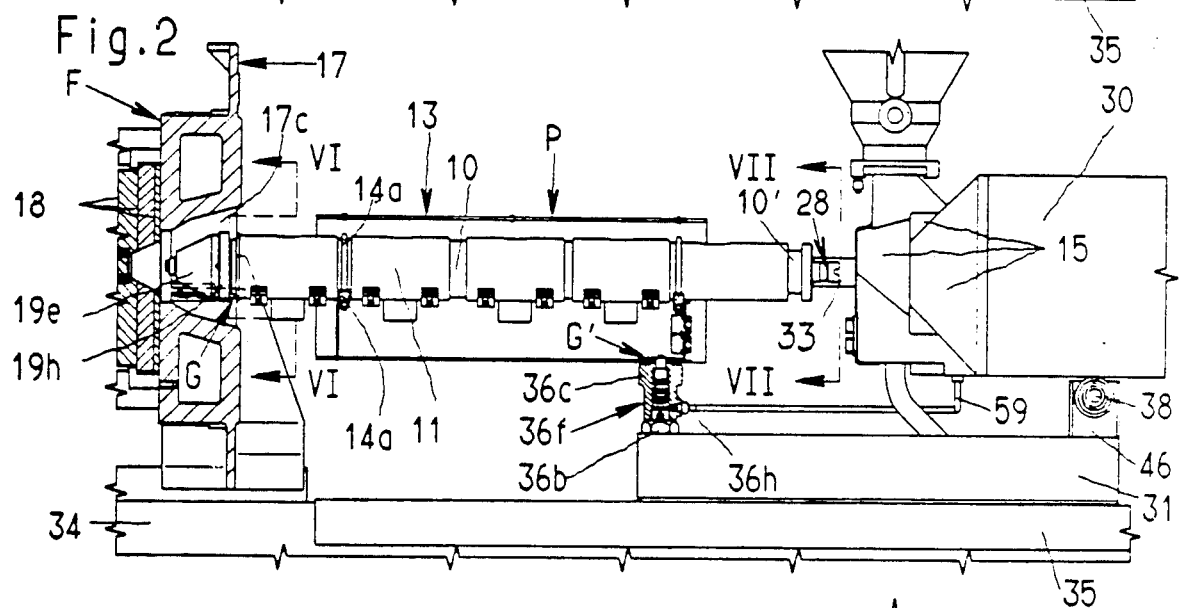
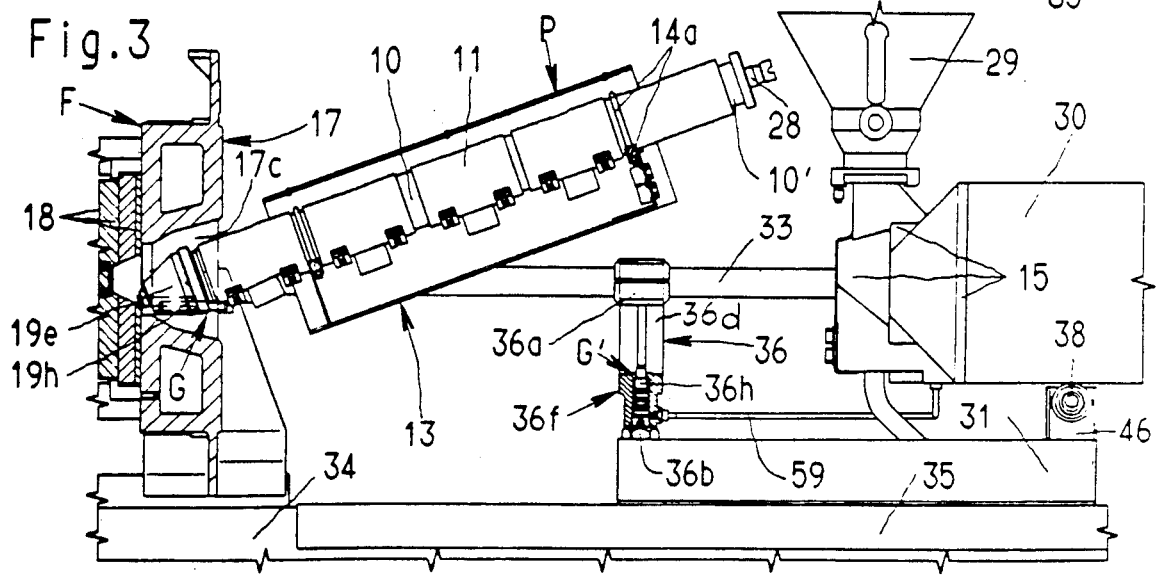

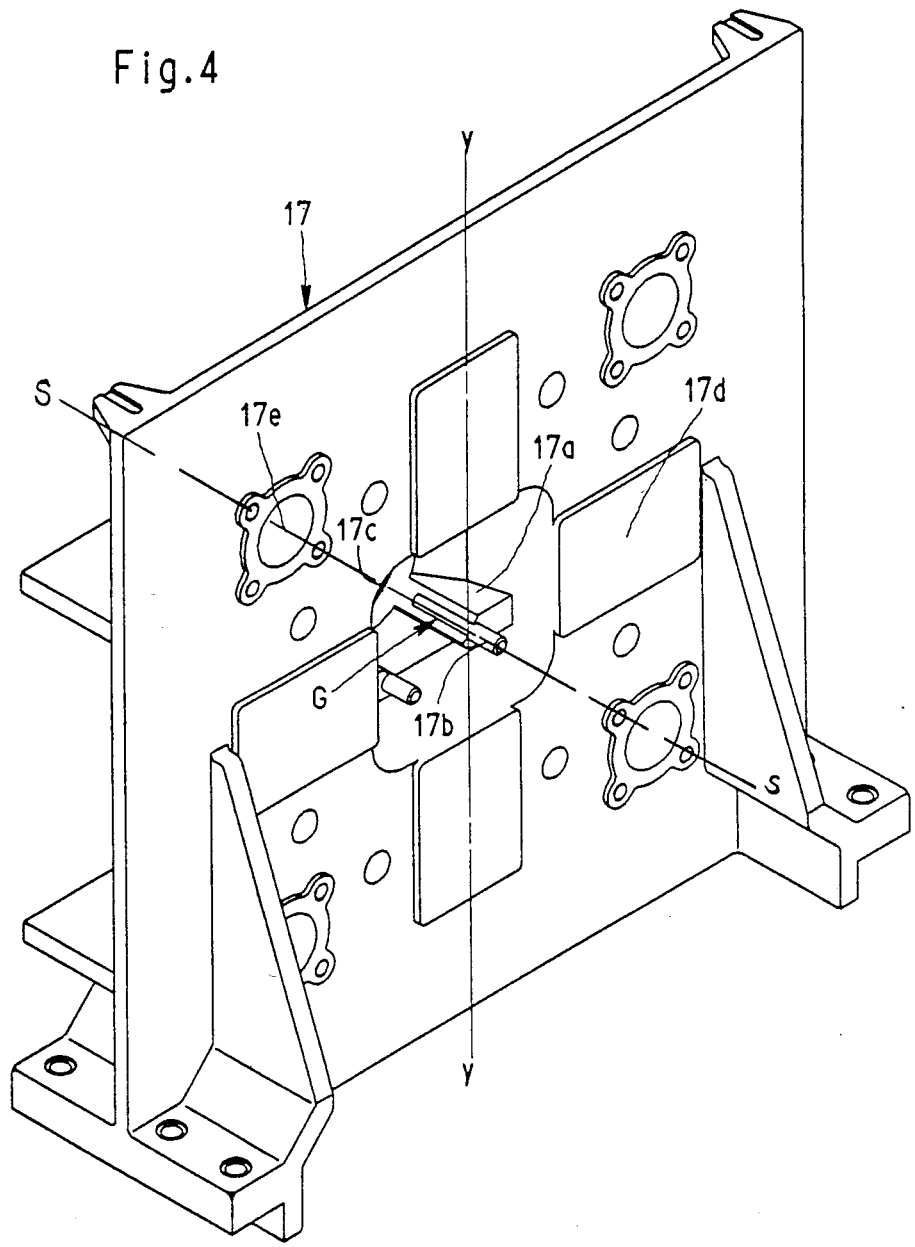

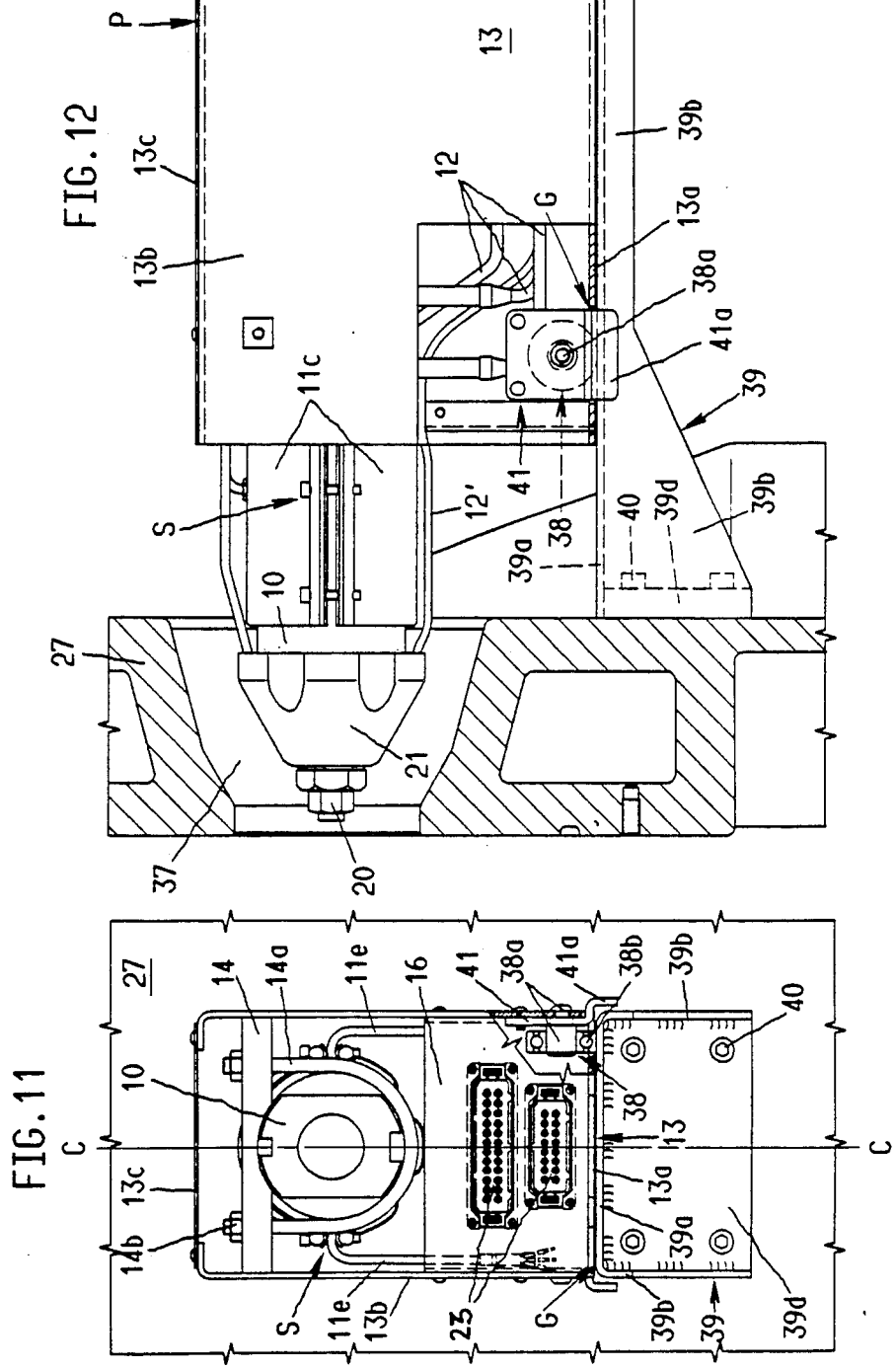

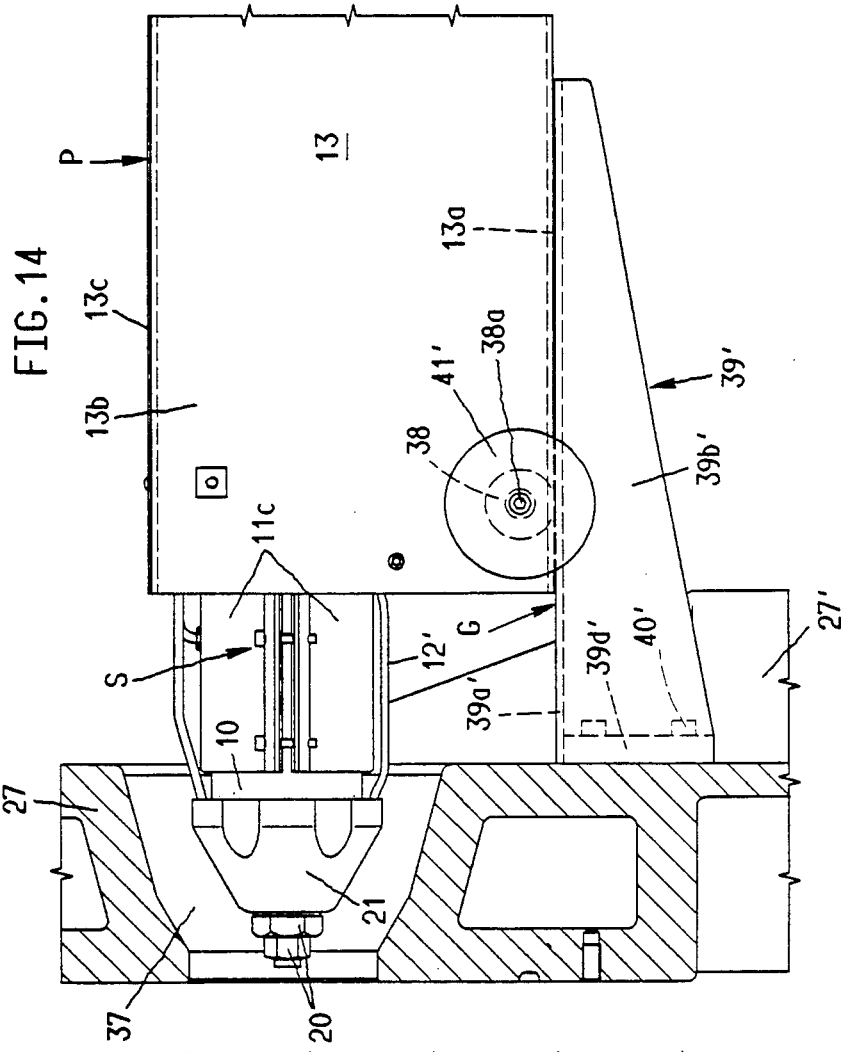
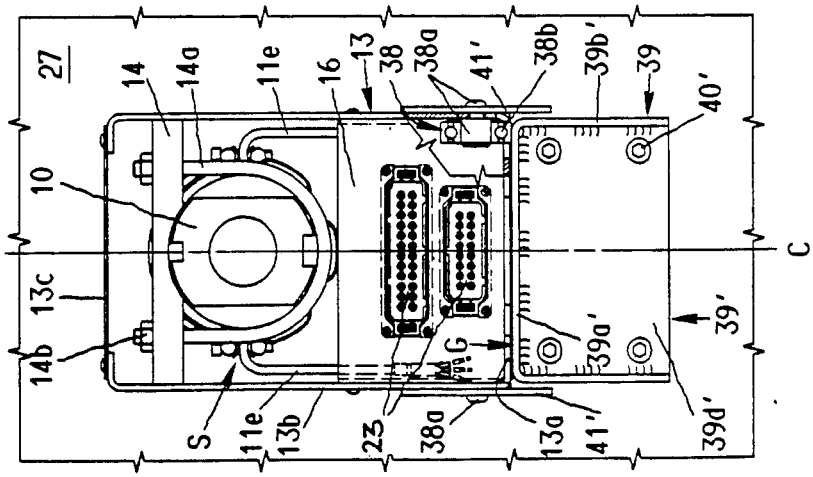

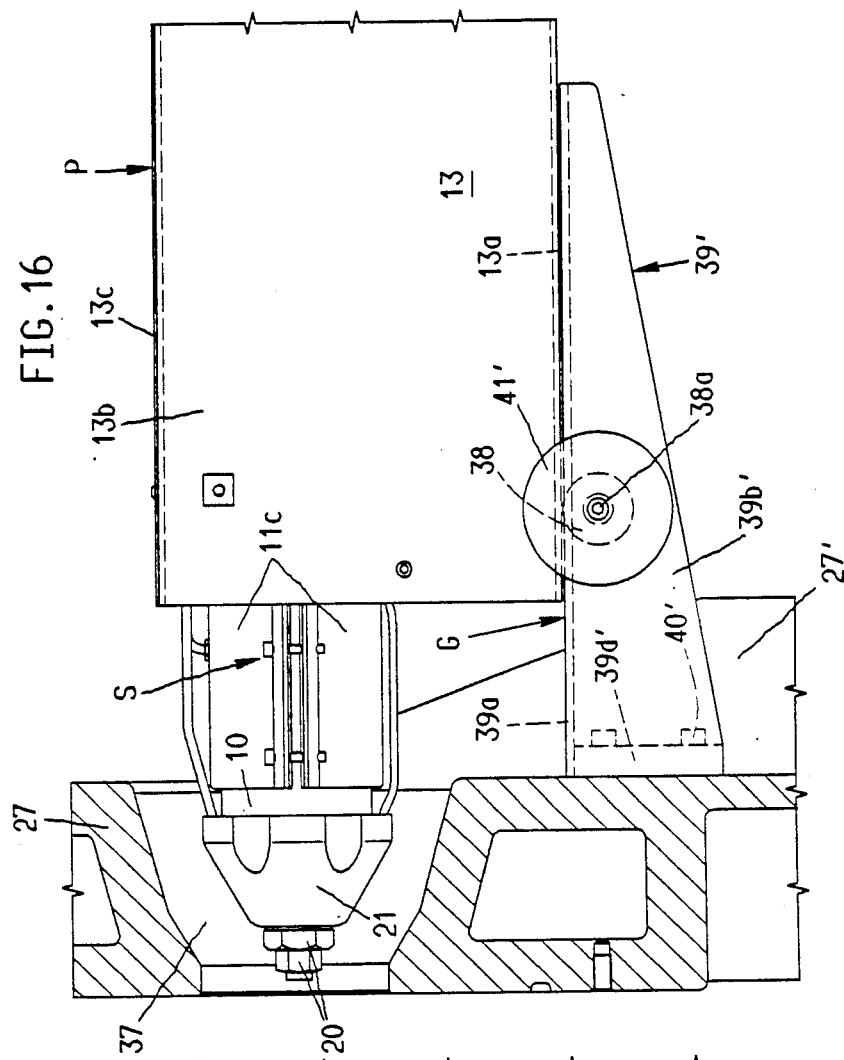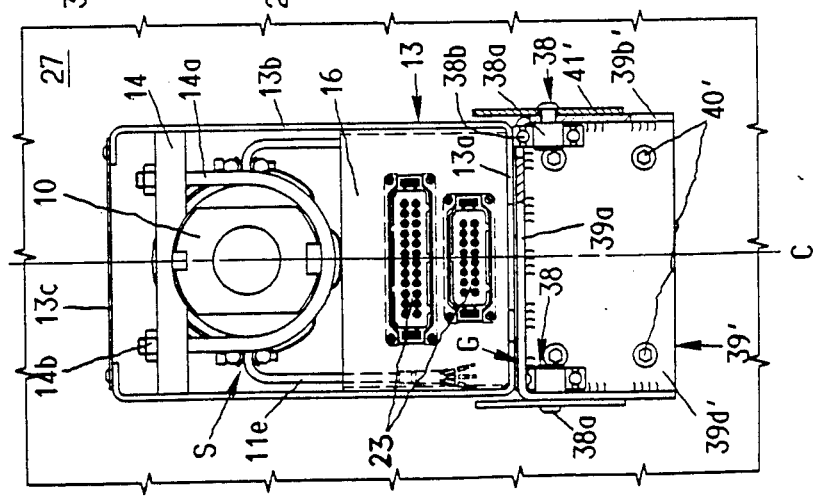

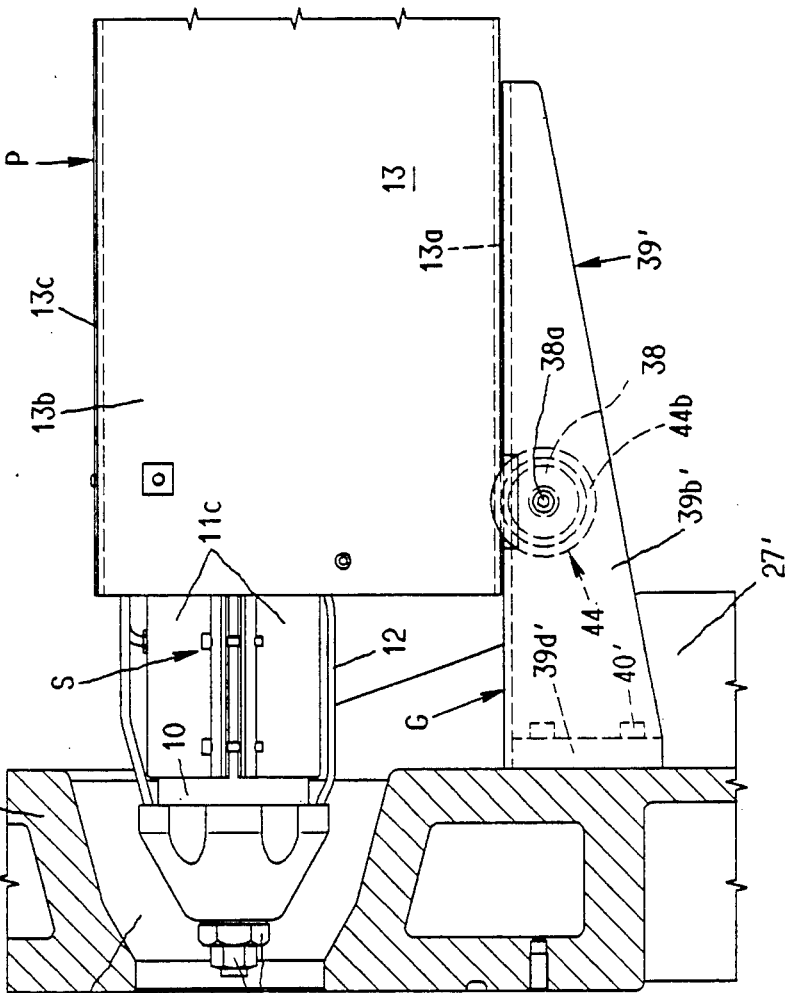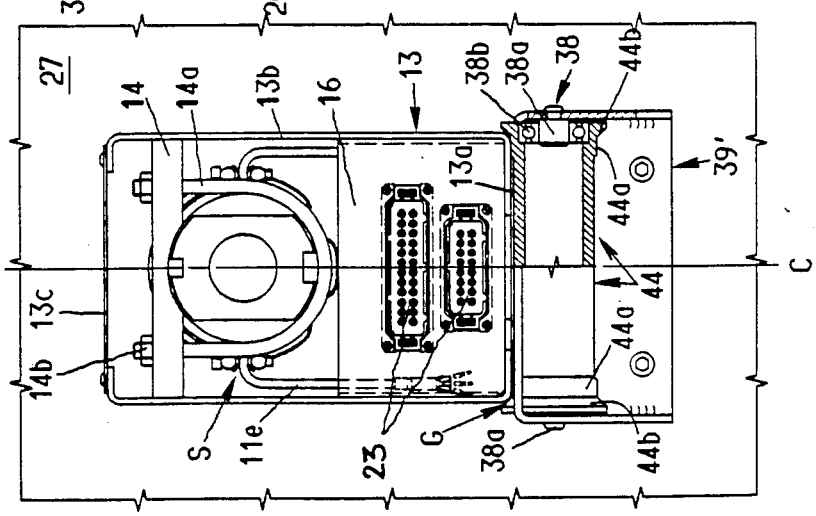

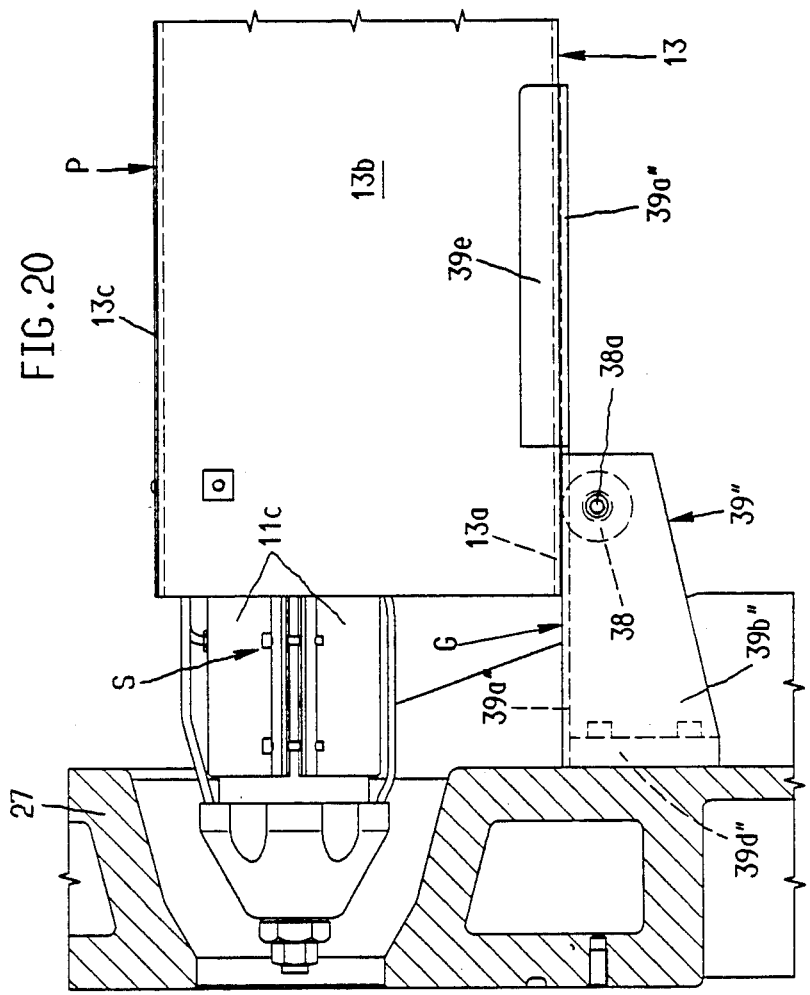
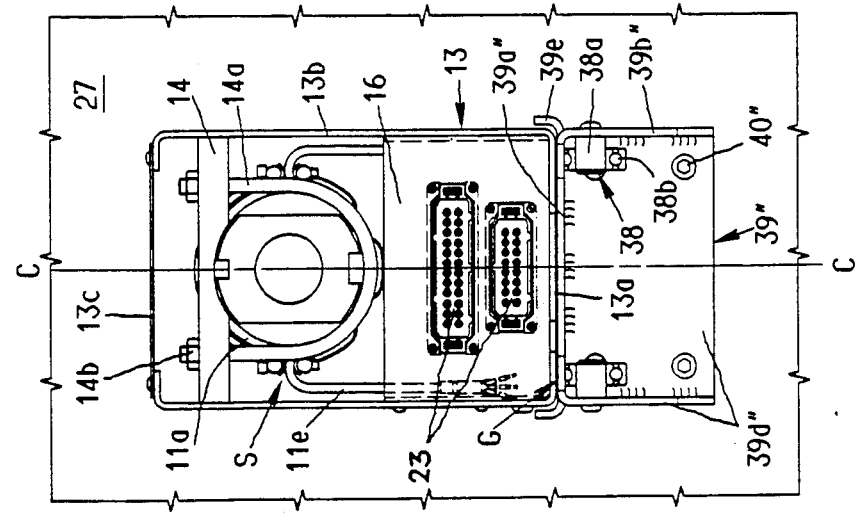
FIG. 20
FIG. 19

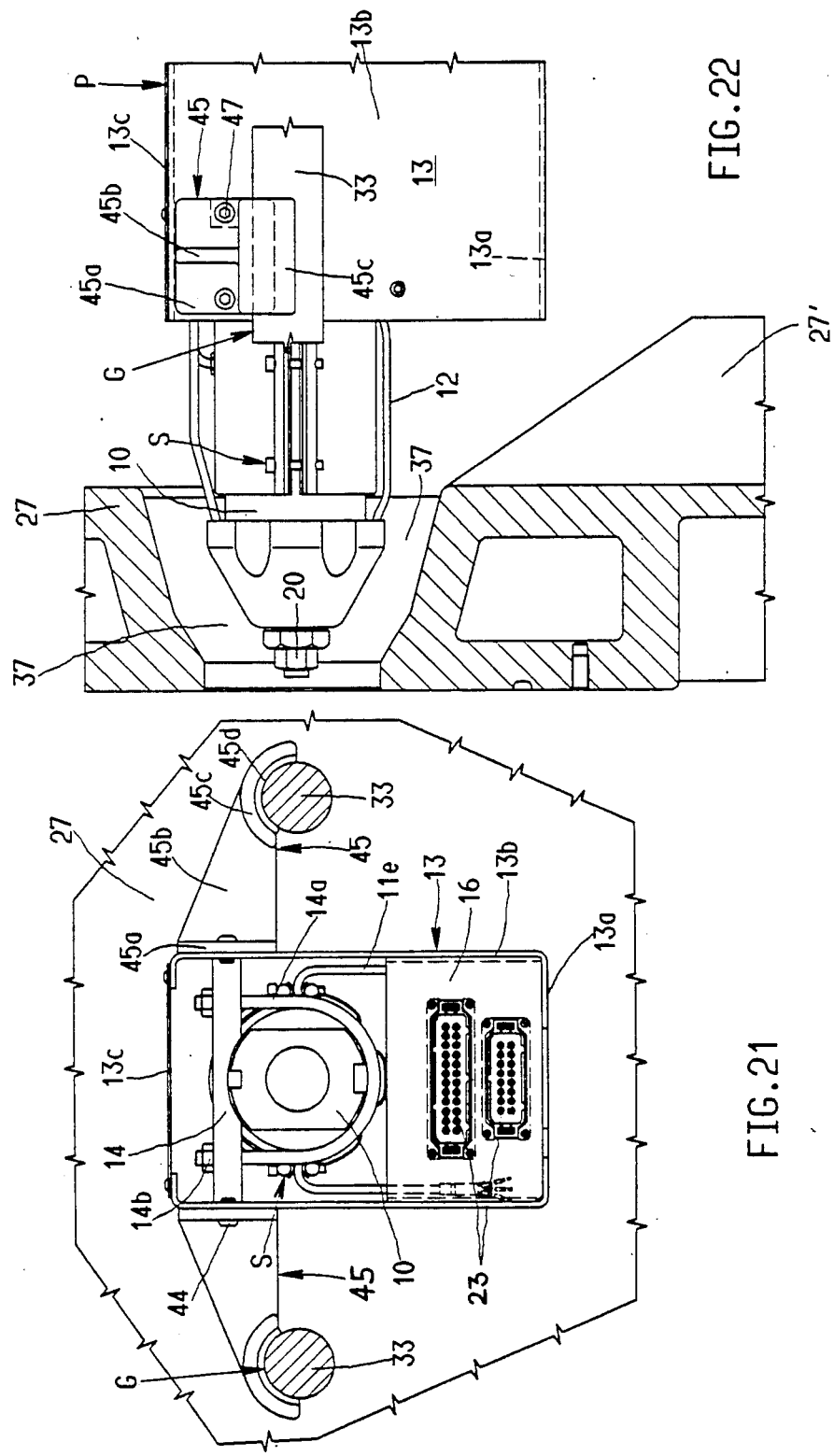

1

INJECTION MOLDING MACHINE

BACKGROUND OF THE INVENTION

This invention relates to an injection molding machine for synthetic materials and is of the type which has an injection molding unit which, by means of a hydraulic drive cylinder may be inserted on and withdrawn from an injection mold assembly held in a mold closing unit. The machine further has a hydraulic injection cylinder which imparts axial injection strokes to a rotary feed screw which is axially displaceably accommodated in a plasticizing cylinder of the injection molding unit. The injection molding machine further has a carrier block which is provided with a bore for receiving the rear terminus of the plasticizing cylinder. The carrier block is equipped with a supply device for the synthetic material and a mechanism for an axial immobilization of the plasticizing cylinder in the carrier block. There is further provided a low-friction supporting assembly on which the plasticizing cylinder is supported during its insertion into or its removal from the injection mold assembly.

In a known injection molding machine of the above-outlined type, as disclosed, for example, in German Offenlegungsschrift (non-examined published application) No. 1,554,768, the plasticizing cylinder is held for pivotal motion about a vertical axis together with its carrier block and a component of the machine frame supporting the carrier block. Even during the pivotal motion and in the extreme pivotal position the plasticizing cylinder is backed up by a rolling support adjacent the injection mold. A release of the plasticizing cylinder from the centering supports of the carrier block as part of an automatic injection mold replacement is neither intended nor possible. A separation of the plasticizing cylinder from the carrier block may be effected only by a manual disassembly.

In another known injection molding machine of the above-outlined type, as disclosed, for example, in German Pat. No. 2,907,557, to which corresponds U.S. Pat. No. 4,278,354, the supporting assembly is formed of two shell-like components which are connected to one another by a releasable tightening device. A support ring is displaceably held on stationary columns by means of bilateral, horizontal tightening projections of the shell-like components by means of slide sleeves.

It is further known, as disclosed, for example, in German Offenlegungsschrift No. 3,229,223, to provide the preconditions in an injection molding machine for an automatic replacement (exchange) of the plasticizing unit (formed of the plasticizing cylinder and the feed screw) by means of computer-controlled couplings at the plasticizing cylinder and the feed screw. In such an arrangement, however, the plasticizing cylinder forms, with the carrier block, a structural unit which is intended and adapted for replacement as a whole. For a replacement of the plasticizing unit it is therefore necessary to take off the plastic material supply device from the carrier block and thereafter disconnect and remove the structural unit, formed of the plasticizing cylinder and the carrier block, from the remaining component assembly of the injection molding unit.

It is further known, as disclosed for example, in U.S. Pat. No. 3,068,521, to provide a cover completely surrounding the plasticizing cylinder which may be released from its carrier block only by disassembly.

It is also known to provide the plasticizing cylinder of an injection molding machine with a circumferential groove at its rear terminus for engagement by a coupling device which, however, forms part of a permanent mount and thus may not be releasable by computer control.

SUMMARY OF THE INVENTION

It is an object of the invention to provide an injection molding machine of the above-outlined type which has an improved supporting assembly for the plasticizing cylinder, requiring insubstantial technological input and expense and which, for serving a largely computerized replacing operation, holds the plasticizing unit (formed of the plasticizing cylinder and the feed screw) subsequent to the withdrawal thereof from the injection mold assembly and release thereof from the carrier block, in a stable manner, and further, the plasticizing unit may be removed from the supporting assembly without a manual releasing operation.

This object and others to become apparent as the specification progresses, are accomplished by the invention, according to which, briefly stated, in the carrier block there is arranged a computer-controllable coupling device which is adapted to project into a recess of the plasticizing cylinder and further, the plasticizing cylinder which may be axially immobilized by a clamping device may be released from the carrier block by a rearwardly oriented motion (releasing motion) of the injection molding unit. Further, the plasticizing cylinder which is, after its release from the carrier block, resting on a first support adjacent the injection mold assembly is supported at its rear terminus axially immovably on a second support. Both the first and the second supports are designed such that the plasticizing cylinder may be lifted off the supports in a vertically upward direction.

The invention as outlined above has the advantage that the plasticizing cylinder which at its rear terminus is released from the carrier block, may be, if required, carried away while tilting it about an axis which is perpendicular to the axis of injection.

BRIEF DESCRIPTION OF THE DRAWING

FIG. 1 is a side elevational view, partially in section, of an injection molding machine incorporating a preferred embodiment of the invention, illustrating the plasticizing cylinder in a position withdrawn from the injection mold assembly.

FIG. 2 is a view similar to FIG. 1, showing the plasticizing cylinder after its rear terminus is freed from the carrier block.

FIG. 3 is a view similar to FIG. 2, illustrating the plasticizing unit during removal from the injection molding machine.

FIG. 4 is a perspective view of a stationary mold carrier including, according to the invention, a support mechanism for the plasticizing cylinder.

FIG. 11 is a rear elevational view of the construction shown in FIG. 10.

FIG. 12 is a side elevational view of one part of the construction shown in FIG. 8, on an enlarged scale relative thereto.

FIGS. 13 to 22 show five variants, in views corresponding to those of FIGS. 11 and 12.

DESCRIPTION OF THE PREFERRED EMBODIMENTS

In the description which follows, generally common characteristics of all the embodiments will be set forth.

Referring to FIGS. 1-3, a mold closing unit F and an injection molding unit having a horizontal injection axis s—s are supported on a machine stand or base 34 having a cover 35. The injection molding unit may be inserted in and withdrawn from an injection mold assembly 18 firmly clamped in the mold closing unit F in an axial direction by virtue of an axial sliding motion on horizontal columns 33 which are axially immobilized and supported by the stationary mold carrier (thrust plate) 17.

Figure 7:
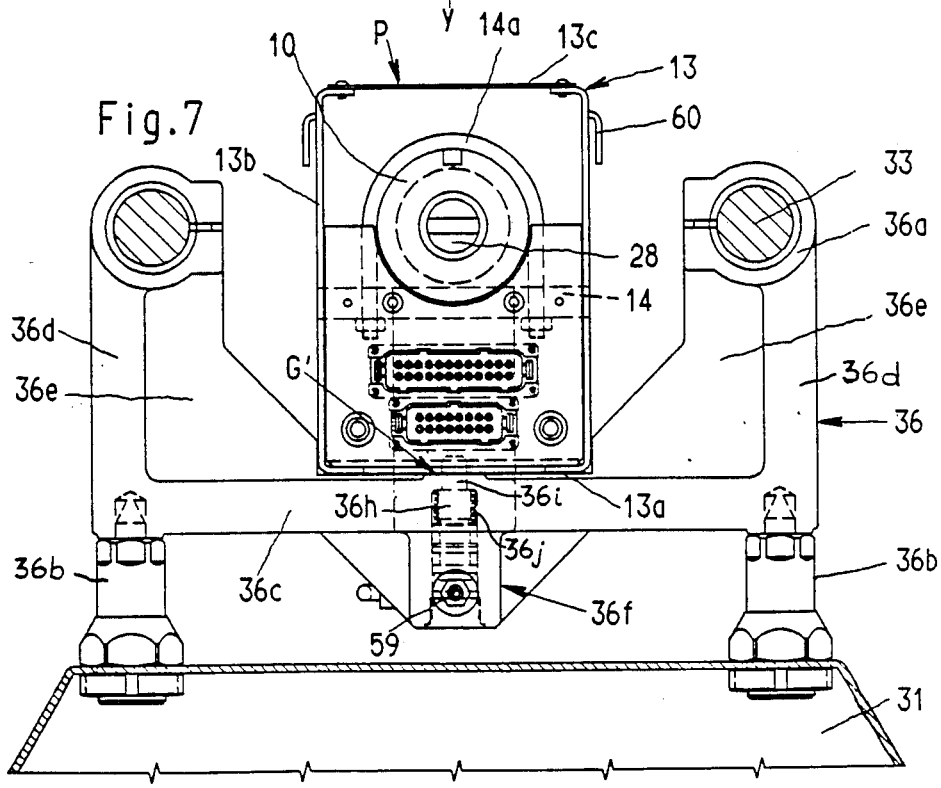
FIG. 7 is a sectional view taken along line VII—VII of FIG. 2 on an enlarged scale.
Figure 8:
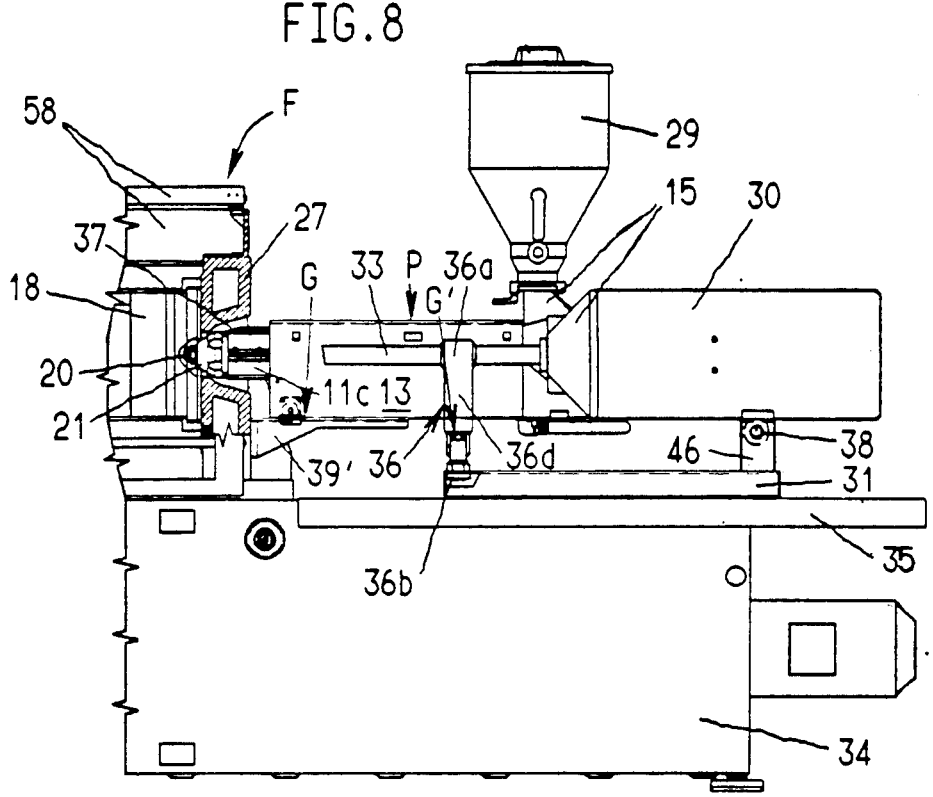
FIG. 8 is a side elevational view, partially in section, of an injection molding machine incorporating a further preferred embodiment of the invention.
Figure 9:
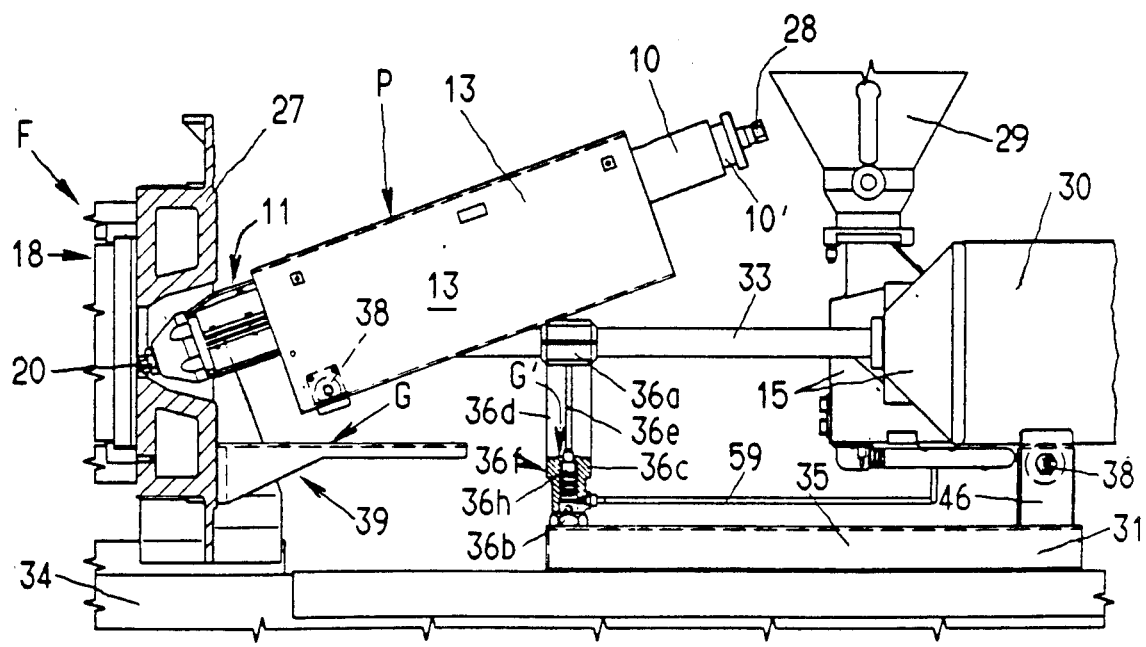
FIG. 9 is a view similar to FIG. 8, illustrating the plasticizing unit during replacement thereof.

Also referring to FIG. 7, at a substantial distance from the mold carrier 17 there is arranged a support yoke 36 which has clamping sleeves 36a that surround and support the respective columns 33. The clamping sleeves 36a are disposed at the free ends of vertical legs 36d which form part of the support yoke 36 and which are connected with one another by means of a horizontal web 36c. The support yoke 36 is arranged on a support platform 31 of the machine stand 34. The support yoke 36 is secured to and centered on the support platform 31 by carrier posts 36b.

A rail 13 of U-shape cross section surrounds a plasticizing cylinder 10 and extends along a central axial portion thereof. The rail 13 which thus serves as an elongated casing, is complemented to a rectangular tube, closed on four sides, by means of an upper cover plate 13c and thus surrounds the plasticizing cylinder 10 on all sides with a clearance. The rear terminus of the plasticizing cylinder 10 is provided with a circumferential groove 10'. Also referring to FIGS. 10 and 11, the plasticizing cylinder 10 is suspended in the rectangular tube 13, 13' from horizontal carrier webs 14 which, in turn, are supported by the vertical legs 13b of the rail 13. The horizontal carrier webs 14 lie tangentially on the plasticizing cylinder 10 and are traversed by the free ends of U-brackets 14a which surround the plasticizing cylinder 10 and which are secured in the associated carrier web 14 by means of nuts 14b.

The plasticizing unit P formed of the plasticizing cylinder 10 and a feed screw 28 received coaxially in the plasticizing cylinder 10 is, during the injection operation, including an axial displacement in the course of an insertion of the plasticizing unit in and its withdrawal from the injection mold assembly 18, supported on a first support G with the intermediary of friction-reducing components.

The rearward terminus of the plasticizing cylinder 10 is received in a form-fitting manner in a central bore of a carrier block 15 which is provided with a supply device (such as a reservoir 29) for the synthetic material.

Figure 24:
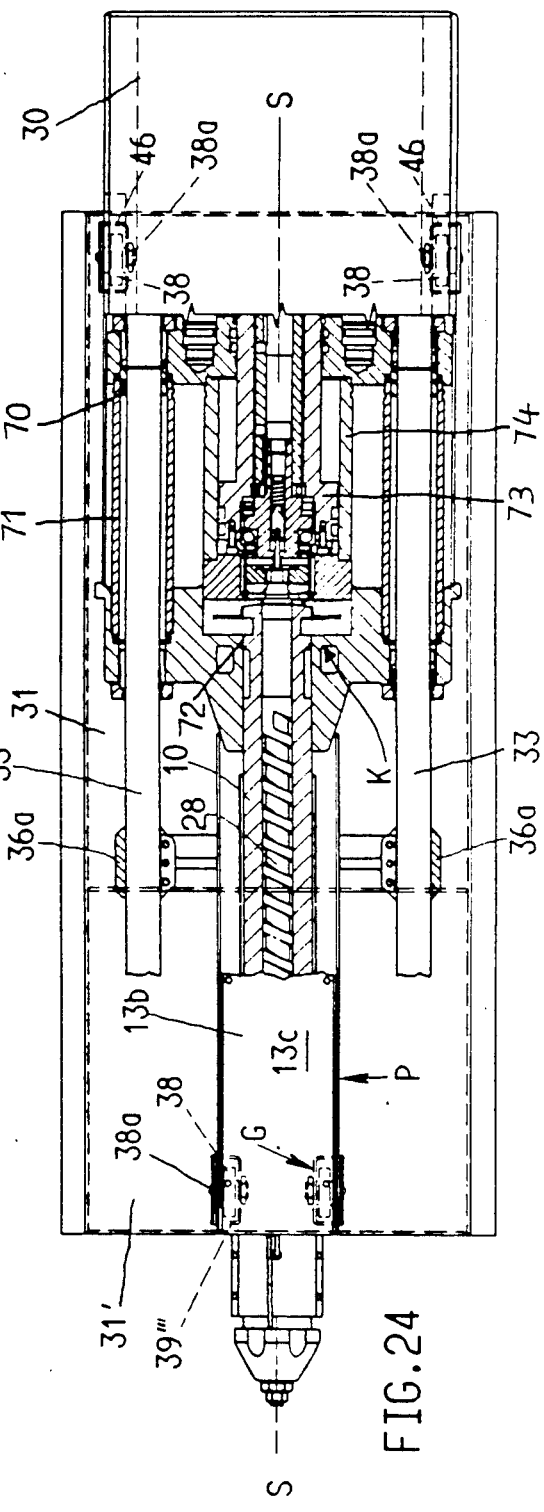
FIG. 24 is a sectional view taken along line XXIV—XXIV of FIG. 23.

The plasticizing cylinder 10 may be axially immobilized in the carrier block 15 by means of a computer-controllable coupling K which is received in the carrier block 15 and whose radially guided, diametrically arranged locking bolts 72 project, in the locking position, into the circumferential groove 10' of the plasticizing cylinder 10, as shown in FIG. 24.

Figure 10:
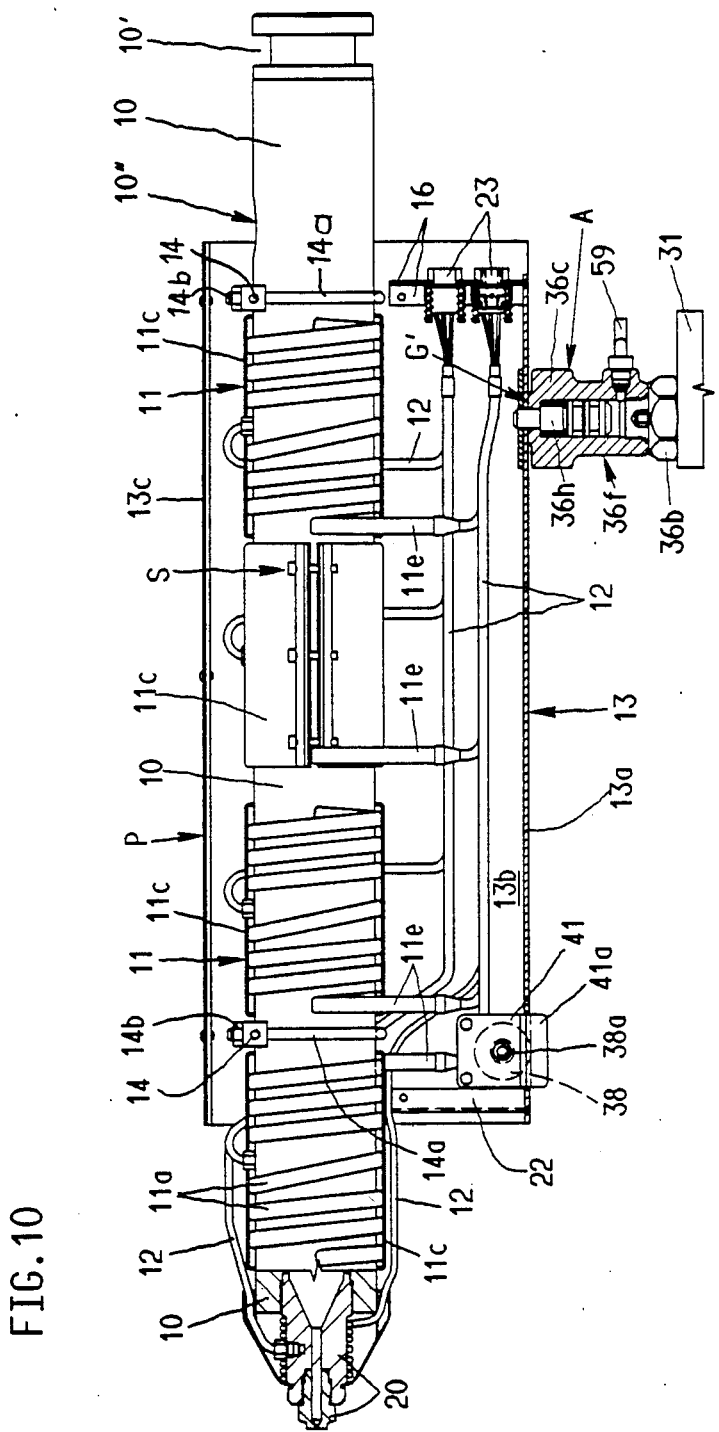
FIG. 10 is a side elevational view, partially in section, of the plasticizing cylinder, on an enlarged scale relative to FIGS. 8 and 9.

The plasticizing cylinder 10 which may be axially immobilized by a clamping device (clamping bolts cooperating with the locking bolts) is releasable from the carrier block 15 by means of a rearwardly oriented motion (releasing motion) of the injection molding unit. The plasticizing cylinder 10 which is supported on the first support G adjacent the injection mold 18 and which is released from the carrier block 15, is supported at its rear terminus in an axially immovable manner on a second support G'. The second support G' is essentially formed by the horizontal web 36c of the support yoke 36. The released plasticizing unit P rests, with the lower horizontal web 13a of the rail 13, on the horizontal web 36c of the support yoke 36. The rail 13 is, with its vertical legs 13b centered between centering ribs 36e of the support yoke 36 (FIG. 7). During the releasing motion the remaining component assembly of the injection molding unit, comprising the carrier block 15 with the supply device 29, moves axially on two rollers 38 mounted on support posts 46 attached to the platform 31 of the machine frame 34. The remaining component assembly of the injection molding unit also includes the driving cylinder as well as the injection cylinder which are surrounded by a casing 30. As the injection molding unit executes its releasing motion in the rearward direction (that is, away from the injection mold assembly 18), the disconnected plasticizing cylinder 10 is stopped in its axial rearward motion by means of a hydraulic cylinder 36f whose piston 36h projects, with its stopping pin 36i, into a stop hole provided in the rail 13, as seen in FIGS. 7 and 10. The stopping cylinder 36f is formed by a bore provided in the web 36c of the support yoke 36. The stopping cylinder 36f is, in a timed manner, that is, upon the initiation of the exchange procedure of the plasticizing unit P, charged with a hydraulic medium through the pressure conduit 59. Upon depressurization of the hydraulic stopping cylinder 36f the piston 36h, together with the stopping pin 36i, is moved out of the stop hole of the rail 13 by means of a return spring 36j.

In the description which follows, further details of the preferred embodiment illustrated in FIGS. 1-7 will be set forth.

Figure 5:
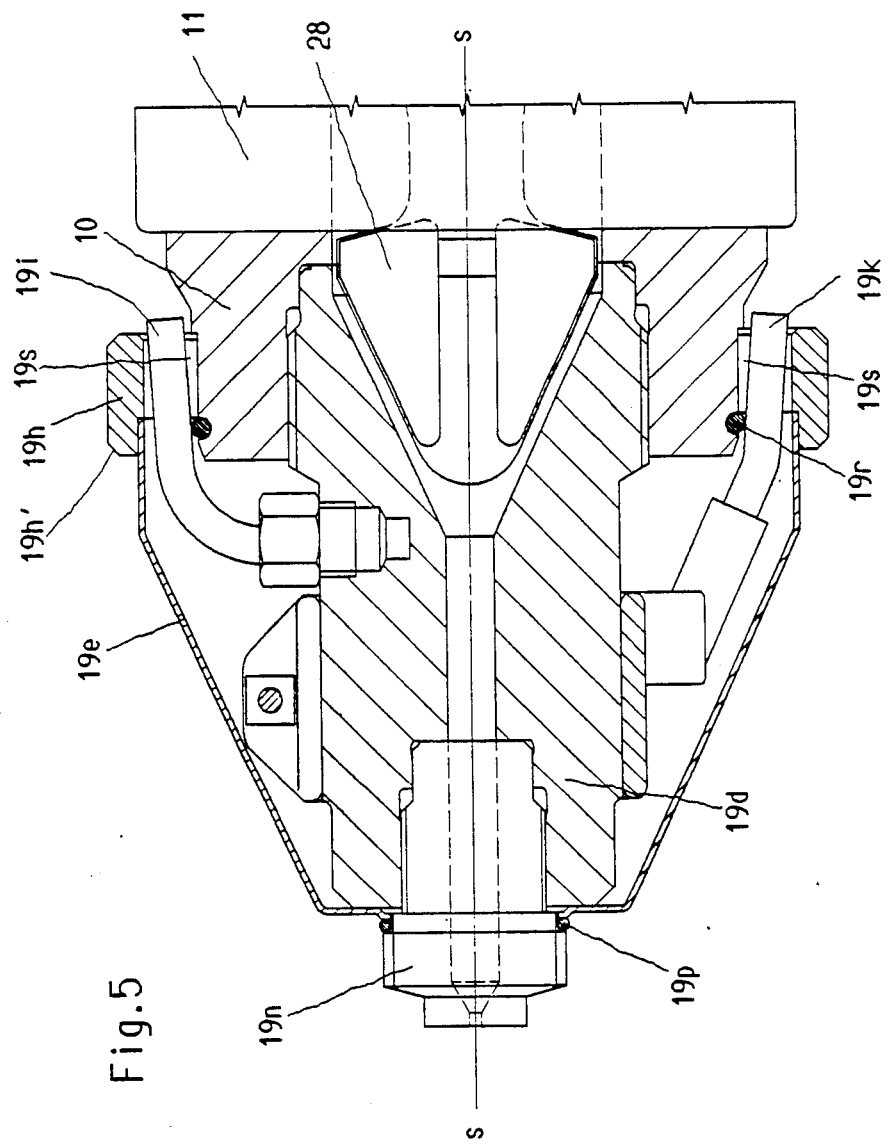
FIG. 5 is an axial sectional view of a frontal end of the plasticizing unit, shown on an enlarged scale relative to FIGS. 1-3.

With particular reference to FIG. 5, the plasticizing cylinder 10 is provided with a nozzle body 19d and a nozzle tip 19n. A support ring 19h serves as a support mechanism for the plasticizing unit P; it sits firmly on the plasticizing cylinder 10 and is prevented from a rearward axial displacement by a radial shoulder of the frontal terminus of the plasticizing cylinder 10 (FIG. 5) and is prevented from a forward axial motion by a snap ring 19r seated in a complemental circumferential groove provided in the frontal terminus of the plasticizing cylinder 10. The nozzle body 19d is concentrically surrounded by a frustoconical cover 19e which radially extends across the frontal end of the nozzle body 19d. The cover 19e is immobilized by means of a snap ring 19p seated in a complemental circumferential groove provided in the nozzle tip 19n. The cover 19e is centered at its rearward terminus by the support ring 19h. Electric conductors 19i–19k pass axially through the annular clearance defined between the support ring 19h and the periphery of the end portion of the plasticizing cylinder.

Figure 6:
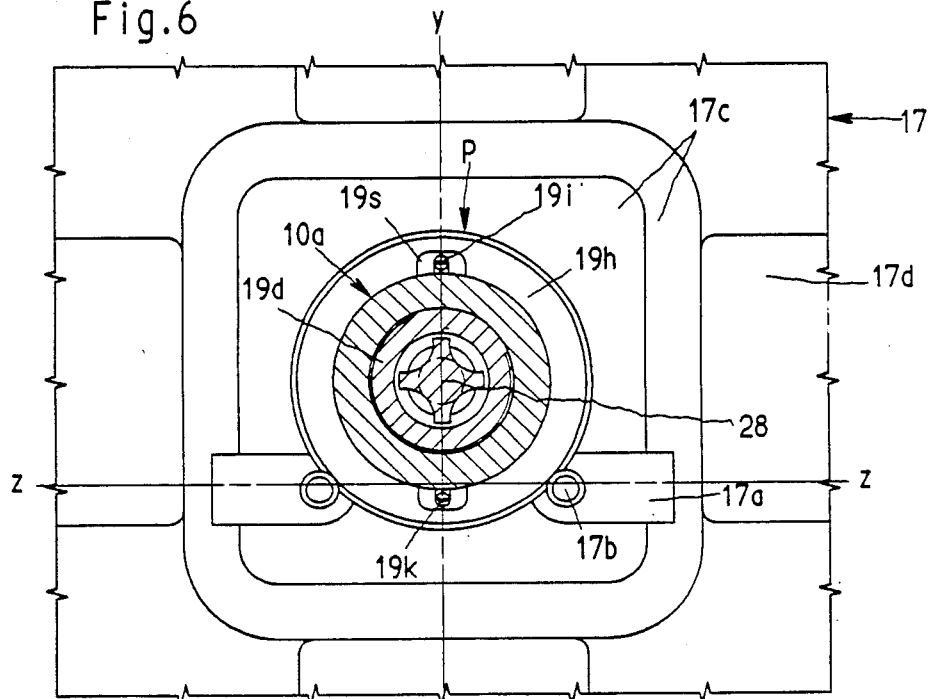
FIG. 6 is a sectional view taken along line VI—VI of FIG. 2 on an enlarged scale.

Referring now to FIGS. 4 and 6, the first support G adjacent the injection mold assembly 18 includes two support pins 17b oriented parallel to the injection axis s—s. The support pins 17b are situated underneath the injection axis s—s substantially within the passage 17c of the clamping plate 17 for the injection mold assembly 18 and are arranged symmetrically relative to a vertical symmetry axis y—y. The support pins 17b are anchored in integral projections 17a of the cast clamping plate 17. The projections 17a extend from vertically oriented bounding surfaces of the passage 17c. The support pins 17b which are received approximately along two-thirds of their length in the projections 17a, are chamfered at their frontal terminus. As seen in FIG. 5, the support ring 19h has, between its circumferential surface and its end face oriented perpendicularly to the injection axis s—s, a run-on face 19h' which is oriented at an angle of approximately 30° to the injection axis s—s. This facilitates a run-up of the plasticizing cylinder 10 onto the chamfers of the support pins 17b.

In a position of the injection molding unit as illustrated in FIG. 1, the stopping piston 36h of the hydraulic stopping cylinder 36f is in alignment with the stop hole provided in the web 13a of the rail 13. Upon replacement of the plasticizing unit P first the stopping piston 36h is, with its stopping pin 36i introduced into the stop hole of the rail 13 as may be observed in FIGS. 1, 2 and 7. At the same time, the plasticizing cylinder 10 and the feed screw 28 are disconnected from the remainder of the injection molding unit as controlled by a computer program.

For disconnecting the plasticizing cylinder 10 from the carrier block 15, the locking bolts (designated at 72 in FIG. 24) guided radially in the carrier block 15 are withdrawn by hydraulic means from the annular groove 10' of the plasticizing cylinder 10. By means of a reverse stroke of the drive cylinders (designated at 70, 71 in FIG. 24) the carrier block 15 is drawn off the axially immobilized plasticizing cylinder 10 and in this manner the plasticizing unit P is released from the carrier block 15 as may be observed in FIG. 6. During the reverse stroke of the drive cylinders 70, 71, the remainder of the injection molding unit rolls in a rearward direction (that is, away from the injection mold assembly 18) on the rollers 38 of the support 46 held on the platform 31.

Upon releasing the plasticizing unit P from the carrier block 15, the former may drop approximately 0.5 mm and then be supported on the web 36c of the support yoke 36, constituting the second support G'. Such a drop manifests itself as a slight tilting motion of the plasticizing unit P about an axis z—z while the support ring 19 and the support pins 17b together act as a fulcrum (FIG. 6). For transporting away the plasticizing unit P, gripper components of a transport mechanism engage transporting hooks 60 (FIG. 7) in such a manner that a tilted position is obtained as illustrated in FIG. 3. Such a tilted position is not required in case the plasticizing unit P has already been axially removed entirely from the passage 17c of the thrust plate 17 by the withdrawal stroke from the injection mold assembly. Thus, in such a case a removal of the plasticizing unit P by the transporting device is feasible without tilting, that is, in a horizontal orientation.

In the description which follows, the embodiments illustrated in FIGS. 8–20 will be set forth.

In the embodiment illustrated in FIGS. 8–12 the plasticizing unit P is supported, by means of runner rollers 38 on the first support G formed by a sheet metal member 39 which has an inverted U-shaped cross section and thus has a top horizontal web 39a and vertical, downwardly oriented legs 39b (FIGS. 11 and 12). The runner rollers 38 are mounted on the inside of the vertical legs 13b of the rail 13. In the zone of the runner rollers 38 the vertical legs 13b are provided with reinforcing plates 41. The lower ends of the latter are bent horizontally and then vertically to provide a vertical terminal plate portion 41a which extends with a clearance over the respective leg 39b of the sheet metal member 39. The web 13a of the rail 13 is at a distance from the lower generatrix of the plasticizing cylinder 10 which is greater than the diameter of the plasticizing cylinder 10. In this manner there is provided a space, screened by the rail 13, for conductors 11e of heating coils 11a as well as conductors 12 and their coupling terminals 23. As may be seen in FIG. 12, clamping shells 11c surround the plasticizing cylinder 10 and are tightened to one another by means of clamping devices S. The shells 11c also surround the heating coil 11a for the plasticizing cylinder 10. The heating coil 11a, its conductors 11e as well as the clamping shells 11c form part of a resistance heater assembly 11 for the plasticizing cylinder 10. The closure plate 13c of the rail 13 is spaced from the plasticizing cylinder 10 such that the spacing approximately corresponds to the distance of the vertical leg 13b from the plasticizing cylinder 10. The rectangular tube formed by the rail 13 and the top plate 13c is covered in the front by a protecting plate 22 and at the rear terminus by a connector plate 16 which carries the terminals 23 of the conductors 11e and 12 of the resistance heating.

The plasticizing unit P, after it is released from the carrier block 15 to stand by for a replacement, is supported via the web 13a of the rail 13 on the horizontal web 36c of the support yoke 36 which constitutes the second, rear support G'.

With particular reference to FIGS. 10 and 11, at the first, frontal support G, the runner rollers 38 are formed of a stationary bearing pin 38a and a runner ring 38b having a cylindrical running face. The bearing pin 38a is anchored in the adjacent leg 13d as well as in the reinforcing plate 41. The runner ring 38b projects through a recess slightly beyond the web 13a downwardly and engages the web 39a of the sheet metal component 39.

If, after removing the plasticizing unit P, a new unit is brought from storage and is lowered from above onto the two supports G, G' of the injection molding machine, the edges 41a of the reinforcing plates 41 center the new plasticizing unit P at the side adjacent the injection mold assembly on the first support G. At the rear terminus, that is, on the second support G', the new plasticizing unit P is centered between the centering ribs 36e as may be observed particularly in FIG. 7. In this manner, the straddling edges 41a in the zone of the first support G and the centering ribs 36e of the support yoke 36 of the second support G' secure the newly introduced and rearwardly still free plasticizing unit P against a lateral shift as well which may result, for example, from an unskillful manipulation by the personnel. As seen in FIG. 12, the sheet metal component 39 forming the first support G is connected to the mold carrier 27 by securing elements 40 passing through a securing plate 39d welded to the legs 39b and the web 39a.

The variant illustrated in FIGS. 13 and 14 differs from the embodiment shown in FIGS. 8-12 by the configuration of the reinforcing plates 41' and the sheet metal component 39'. The reinforcing plates 41' are constituted by discs which lie flat against the outer face of the adjacent leg 13b of the rail 13. The vertical legs 39b' of the component 39' of approximately rectangular outline are straddled by the discs 41' for effecting a coarse centering.

The construction shown in FIGS. 15 and 16 differs from that of FIGS. 13 and 14 in that the runner rollers 38 are held in the legs 39b' of the support 39'. The runner rollers 38 pass upwardly through the web 39a' in corresponding recesses and engage, with their runner face, the plasticizing unit P at the web 13a of the rail 13. The discs 41' straddle the legs 13b of the rails 13 for effecting a coarse centering.

In the variant according to FIGS. 17 and 18, the two runner rollers 38 which are mounted in the legs 39b' of the sheet metal component 39' forming the first support G, are connected with one another by a runner cylinder 44. The plasticizing unit P is supported by terminal parts 44a of the cylinder 44. The terminal parts 44a are, at their respective axially outer end, adjoined by centering flanges 44b which straddle the vertical legs 13b of the rail 13.

The variant illustrated in FIGS. 19 and 20 differs from the variant of FIGS. 15 and 16 essentially in that a coarse centering during the vertically downward positioning of the plasticizing unit P is effected with the aid of centering edges 39e which are bent upwardly at 90° from the web 39a" of the sheet metal component 39". The sheet metal component 39" thus has a first portion where, from the horizontal web 39a", vertical legs 39b" are bent downwardly and another, rearward portion where, from the web 39a", the centering edges 39e are bent.

Turning now to the embodiment illustrated in FIGS. 21 and 22, the plasticizing unit P is supported with the aid of the rail 13 via horizontal support arms 45 on columns 33, forming a first support G. The support arms 45 are secured to the vertical legs 13b of the rail 13. Each support arm 45 has arcuate support shells 45c lined with low friction shells 45d and are in engagement with the outer cylindrical faces of the respective columns 33. The support arms 45 lie against the legs 13b by means of joining flanges 45a in the zone of a carrier web 14 and are secured thereto by means of screw elements 47. Thus while—as noted earlier—in the columns 33 serve as a guide support in all embodiments, in the embodiment illustrated in FIGS. 21 and 22 the columns 33 also form a part—together with the support arms 45—of the first support G.

Figure 23:
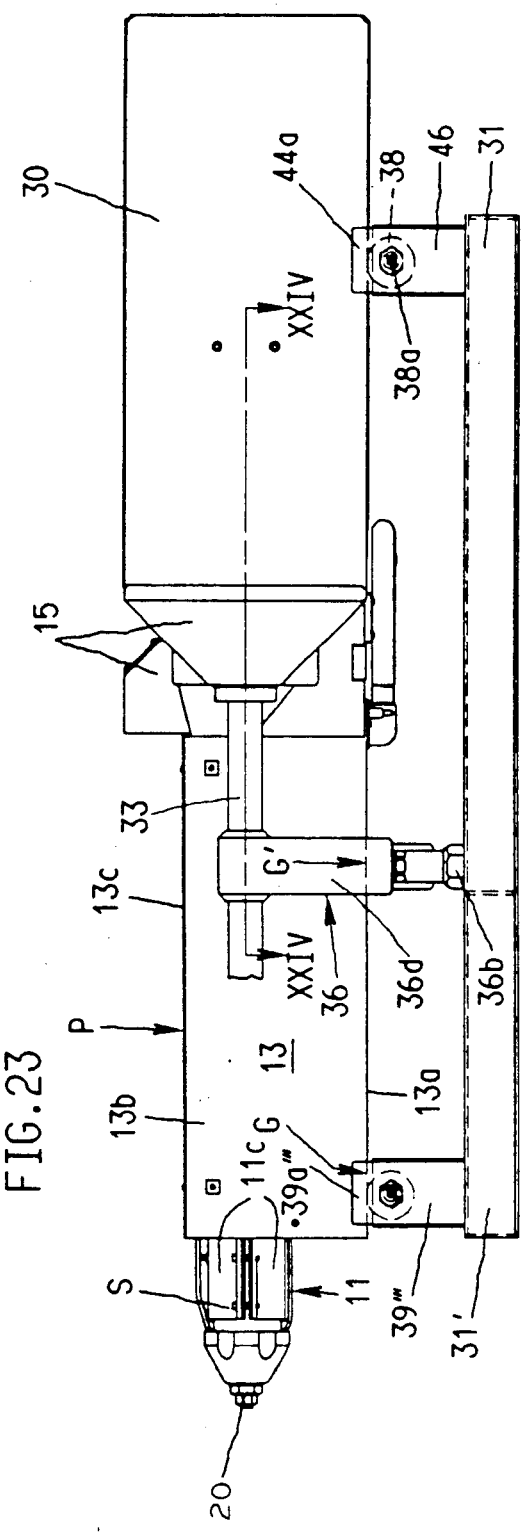
FIG. 23 is a side elevational view of an injection molding machine incorporating further variants of the invention.

In the embodiment illustrated in FIGS. 23 and 24 the web 13a of the rail 13 constitutes, similarly to the modifications shown in FIGS. 15-20, roller tracks for the axially moving plasticizing unit P. The roller tracks extend along the longitudinal marginal zones which form part of the web 13a and which are reinforced by bent longitudinal edges connected with the legs 13b. The first support G is formed by two vertically arranged tubular posts 39''' which are supported on the machine frame 34 with the intermediary of the quadratic support platform 31. The posts 39''' serve as bearings for the runner rollers 38. The external walls 39a''' which form part of the cross-sectionally rectangular posts 39''' and which extend parallel to the injection axis s—s are upwardly slightly extended and thus straddle the legs 13b of the rail 13 with a clearance to effect a coarse centering. FIGS. 23 and 24 further show how the injection molding unit is supported by the protective cover 30 on the supports 46. On the parallel walls of the support 46 there are rotatably mounted the runner rollers 38 by means of bearing pins 38a. The rollers 38 engage, with their running face, the lower horizontal wall of the protective cover 30 which is stiffened by the associated bending edge at the transition into the vertical wall portions.

Turning in particular to FIG. 24, the stationary pistons 70 of the drive cylinders 71 are firmly affixed to the columns 33. The non-rotary piston 73 of the injection cylinder 73, 74 is coupled to the feed screw 28 solely for performing the axial injection stroke thereof. The computer-controllable coupling K which axially immobilized the plasticizing cylinder 10 in the carrier block 15 is of a structure as described in detail in U.S. patent application Ser. No. 852,338 filed Apr. 15, 1986 which is incorporated herein by reference and to which correspond German Patent Application No. P 35 13 411.9 filed Apr. 15, 1985 and No. P 35 26 710.0 filed July 26, 1985. The injection molding unit as such corresponds to that disclosed in German Application No. P 34 47 707.1. All three German applications are incorporated herein by reference.

It will be understood that the above description of the present invention is susceptible to various modifications, changes and adaptations, and the same are intended to be comprehended within the meaning and range of equivalents of the appended claims.

What is claimed is:

1. In an injection molding machine having a generally horizontal axis, including an injection molding unit, an injection mold assembly, a mold closing unit receiving said injection mold assembly, and a first drive means for inserting said injection molding unit in and withdrawing said injection molding unit from said injection mold assembly; said injection molding unit including a plasticizing cylinder having a frontal end insertable into said injection mold assembly and a rear terminus; a feed screw rotatably and axially displaceably accommodated in said plasticizing cylinder, a carrier block form-fittingly receiving said plasticizing cylinder at the rear terminus thereof, immobilizing means for axially fixing the position of said plasticizing cylinder in said carrier block, second drive means for imparting axial injection strokes to said feed screw and a third drive means for rotating said feed screw; the improvement wherein said plasticizing cylinder, together with said feed screw accommodated therein, is capable of being moved by said first drive means into a released position in which said plasticizing cylinder is slightly withdrawn from said injection mold assembly and is separated from said carrier block; the improvement further comprising a first support means situated adjacent said injection mold assembly for supporting said plasticizing cylinder at said frontal end thereof; and a second support means situated at a distance from said first support means for axially supporting said plasticizing cylinder at said rear terminus thereof; said first and second support means upwardly freely removably supporting said plasticizing cylinder in said released position thereof.

2. An injection molding machine as defined in claim 1, wherein said plasticizing cylinder has, at the frontal end thereof, a nozzle body arranged concentrically relative to said plasticizing cylinder; said nozzle body having a frontal radial end face; further wherein said plasticizing cylinder has a frustoconical cover concentrically surrounding said nozzle body and having a part covering said frontal radial end face of said nozzle body.

3. An injection molding machine as defined in claim 1, wherein said mold closing unit includes a mold carrier plate having a vertical symmetry plane; further wherein said first support means includes two parallel-spaced support pins extending under said injection axis parallel thereto and symmetrically relative to said vertical symmetry plane.

4. An injection molding machine as defined in claim 3, wherein said mold carrier plate has a central throughgoing passage adapted to receive said frontal end of said plasticizing cylinder and integral projections situated within said throughgoing passage; said support pins being anchored in said projections.

5. An injection molding machine as defined in claim 3, wherein said plasticizing cylinder comprises a support ring affixed to said plasticizing cylinder concentrically therewith; said support ring being arranged for a cradle-like, centering engagement by said support pins.

6. An injection molding machine as defined in claim 1, further comprising an elongated, rail-like casing of rectangular cross section surrounding said plasticizing cylinder at least along a length portion thereof; said plasticizing cylinder being affixed to said casing; further wherein said second support means includes a stationarily held support yoke having centering ribs spaced from one another in a direction perpendicular to said injection axis; in said released position of said plasticizing cylinder said casing being supported on said yoke and centered thereon by said centering ribs.

7. An injection molding machine as defined in claim 1, further comprising an elongated, rail-like casing of rectangular cross section surrounding said plasticizing cylinder at least along a length portion thereof; said plasticizing cylinder being affixed to said casing; said elongated casing having opposite longitudinal vertical sides; further comprising a plurality of spaced carrier webs attached to said sides and straddling said casing and carrier yokes affixed to respective said carrier webs and looped around said plasticizing cylinder, whereby said plasticizing cylinder is secured to said casing.

8. An injection molding machine as defined in claim 1, further comprising an elongated, rail-like casing of rectangular cross section surrounding said plasticizing cylinder at least along a length portion thereof; said plasticizing cylinder being affixed to said casing; said casing being formed of an upwardly open, cross-sectionally U-shaped member and a cover plate complementing the member into a rectangular tubular component having four sides, said rectangular tubular component spacedly surrounding said plasticizing cylinder on all sides.

9. An injection molding machine as defined in claim 1, further comprising an elongated, rail-like casing of rectangular cross section surrounding said plasticizing cylinder at least along a length portion thereof; said plasticizing cylinder being affixed to said casing; further comprising a machine base; further wherein said first support means comprises vertical support columns mounted on said machine base, a runner roller rotatably mounted in each said support column and arranged for engaging said casing to support said casing together with said plasticizing cylinder; each column having a vertical wall having a plane parallel to said injection axis; said vertical walls straddling said casing with a play when said runner rollers are in engagement with said casing.

10. An injection molding machine as defined in claim 1, wherein said first support comprises horizontal columns extending along either side of said injection axis; further wherein said mold closing unit comprises a mold carrier plate supporting frontal ends of said columns; further comprising an elongated, rail-like casing of rectangular cross section surrounding said plasticizing cylinder at least along a length portion thereof; said plasticizing cylinder being affixed to said casing; a machine base, a support yoke mounted on said machine base and supporting rear ends of said columns; and support arms attached to said casing and extending generally horizontally away therefrom towards respective said columns; said support arms being supported on said columns.

11. An injection molding machine as defined in claim 10, wherein each arm has a support shell conforming to an upper peripheral surface configuration of respective said columns, and each said support shell has a low-friction lining form-fittingly and slidably engaging said columns.

12. An injection molding machine as defined in claim 1, wherein said mold closing unit includes a mold carrier plate; further wherein said first support means includes a sheet metal component having an inverted U-shape as viewed in cross section; said sheet metal component being affixed to said mold carrier plate and projecting generally horizontally therefrom.

13. An injection molding machine as defined in claim 12, further comprising an elongated, rail-like casing of rectangular cross section surrounding said plasticizing cylinder at least along a length portion thereof; said plasticizing cylinder being affixed to said casing; said casing including parallel-spaced vertical sides having inwardly oriented faces and a horizontal web interconnecting said sides and runner rollers mounted for rotation in said sides at the inwardly oriented faces thereof; said runner rollers being arranged for engaging said sheet metal component of said first support means.

14. An injection molding machine as defined in claim 13, further comprising reinforcing plates affixed to said sides at the inwardly oriented faces thereof, in a zone of said runner rollers; said reinforcing plates having lower portions projecting vertically beyond said casing and straddling said sheet metal component of said first support means with a play when said runner rollers are in engagement with said sheet metal component.

15. An injection molding machine as defined in claim 12, wherein said sheet metal component has parallel-spaced vertical sides having inwardly oriented faces and a horizontal web interconnecting said sides and runner rollers, mounted for rotation in said sides at the inwardly oriented faces thereof; further comprising an elongated, rail-like casing of rectangular cross section surrounding said plasticizing cylinder at least along a length portion thereof; said plasticizing cylinder being affixed to said casing; said casing having an outer surface arranged for engagement with said runner rollers.

16. An injection molding machine as defined in claim 15, further comprising reinforcing plates affixed to said sides at the inwardly oriented faces thereof, in a zone of said runner rollers; said reinforcing plates having upper portions projecting vertically beyond said sheet metal component and straddling said casing with a play when said runner rollers are in engagement with said casing.

17. An injection molding machine as defined in claim 15, wherein said horizontal web of said sheet metal component has upwardly turned edges straddling said casing with a play when said runner rollers are in engagement with said casing.

18. An injection molding machine as defined in claim 1, further comprising a protective cover enclosing at least one part of said carrier block and extending rearwardly therefrom; said protective cover having a lower horizontal wall bent upwardly into opposite vertical walls to define lateral bounding edges of said lower horizontal wall; said lateral bounding edges extending generally parallel to said horizontal axis; a third support means situated rearwardly of said second support for supporting said carrier block by engaging said protective cover from below; said third support means including a plurality of rollers spaced horizontally from one another in a direction transverse to said horizontal axis; said rollers being arranged to rollingly engage said lower horizontal wall of said protective cover.

19. An injection molding machine as defined in claim 18, wherein said rollers are two in number and are arranged to engage said lower horizontal wall immediately adjacent respective said bounding edges thereof.

* * * * *